United States Patent
Coffey

[15] 3,654,537
[45] Apr. 4, 1972

[54] HIGH EFFICIENCY POWER SUPPLY FOR CHARGING CAPACITORS IN STEPS

[72] Inventor: David W. Coffey, Westminster, Md.
[73] Assignee: Westinghouse Electric Corporation, Pittsburgh, Pa.
[22] Filed: Apr. 29, 1970
[21] Appl. No.: 32,923

[52] U.S. Cl. ................................... 320/1, 307/54, 307/83, 307/109
[51] Int. Cl. ............................................. H02m 3/24
[58] Field of Search ................... 307/109, 110, 246, 52, 61, 307/71, 77, 83; 320/1

[56] References Cited

UNITED STATES PATENTS

| 3,529,228 | 9/1970 | Cordy | 320/1 |
| 2,507,022 | 5/1950 | Languepin | 320/1 X |

Primary Examiner—Bernard Konick
Assistant Examiner—Stuart Hecker
Attorney—F. H. Henson, E. P. Klipfel and D. Schron

[57] ABSTRACT

A system for direct current resonant charging of capacitors in which the size and weight of the power supply and an inductive choke for limiting surge currents can be materially reduced by charging the capacitor in successive steps, each of a higher voltage level than the preceding step. This reduces the current surge from the supply during each step and also reduces the size of the required choke.

5 Claims, 4 Drawing Figures

Patented April 4, 1972
3,654,537
2 Sheets-Sheet 1
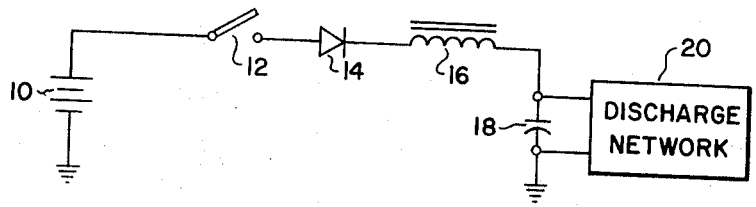
Fig.1 - Prior Art
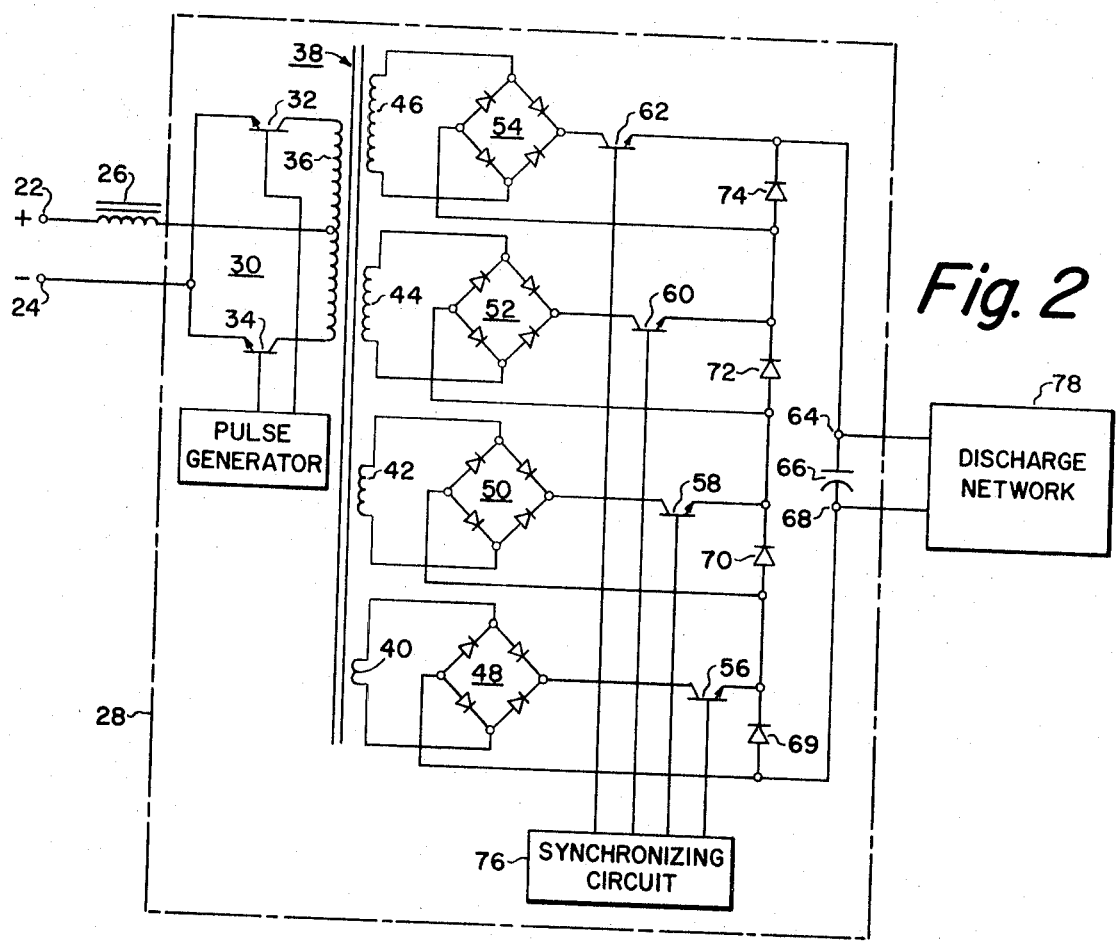
Fig. 2
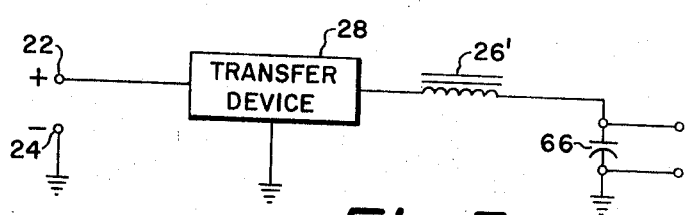
Fig. 3

HIGH EFFICIENCY POWER SUPPLY FOR CHARGING CAPACITORS IN STEPS

BACKGROUND OF THE INVENTION

While not limited thereto, the present invention is particularly adapted for use in charging energy storage capacitors, such as those used to fire a flash tube surrounding a solid-state laser rod. In a typical application of this type, the capacitor must be charged at a rate of about 10 pulses per second to an energy level of 10 to 30 joules. This ordinarily requires a large and heavy power supply; and in order to prevent excessive current surges, an inductive choke must be included in the charging circuit. This choke is also large and, of necessity, heavy. As a result of the weight of the components, such systems are not desirable for use in airborne applications. In addition, systems of this type exhibit high RMS to average current ratios. Such ratios are disadvantageous when using batteries as the primary energy source.

SUMMARY OF THE INVENTION

In accordance with the present invention, the size and weight of the components utilized to charge energy storage capacitors is reduced by charging the capacitor in successive steps, each of a higher voltage level than the preceding step. In the embodiment of the invention shown herein, this is accomplished by chopping direct current from a power supply and by transmitting the chopped current through a transformer provided with a plurality of secondary windings, each having a number of turns different than the other secondary windings. In this manner, voltages of different magnitudes can be made to appear across the respective secondary windings. Switch means, preferably transistor switches coupled to a synchronizing firing circuit, connect the respective secondary windings across said capacitor in sequence whereby the voltage cross the capacitor will rise in steps. In this manner, the size and weight of the power supply and inductive choke used in the system can be materially reduced since the current surge, during each step of the charging process, is relatively small.

Further, in accordance with the invention, the RMS to average current ratio of the system is maintained relatively small by firing the transistor switches, for example, in overlapping relationship whereby one transistor is turned ON before the other cuts off, and so on. In this manner, the current will build up to a more or less steady state value during the charging process without intersecting the zero axis at the termination of conduction of one transistor and before the next transistor fires.

The above and other objects and features of the invention will become apparent from the following detailed description taken in connection with the accompanying drawings which form a part of this specification, and in which:

FIG. 1 illustrates a prior art resonant charging system for capacitors included herein for purposes of explanation;

FIG. 2 illustrates one embodiment of the present invention in schematic circuit form;

FIG. 3 illustrates another embodiment of the invention; and

Figure 4:
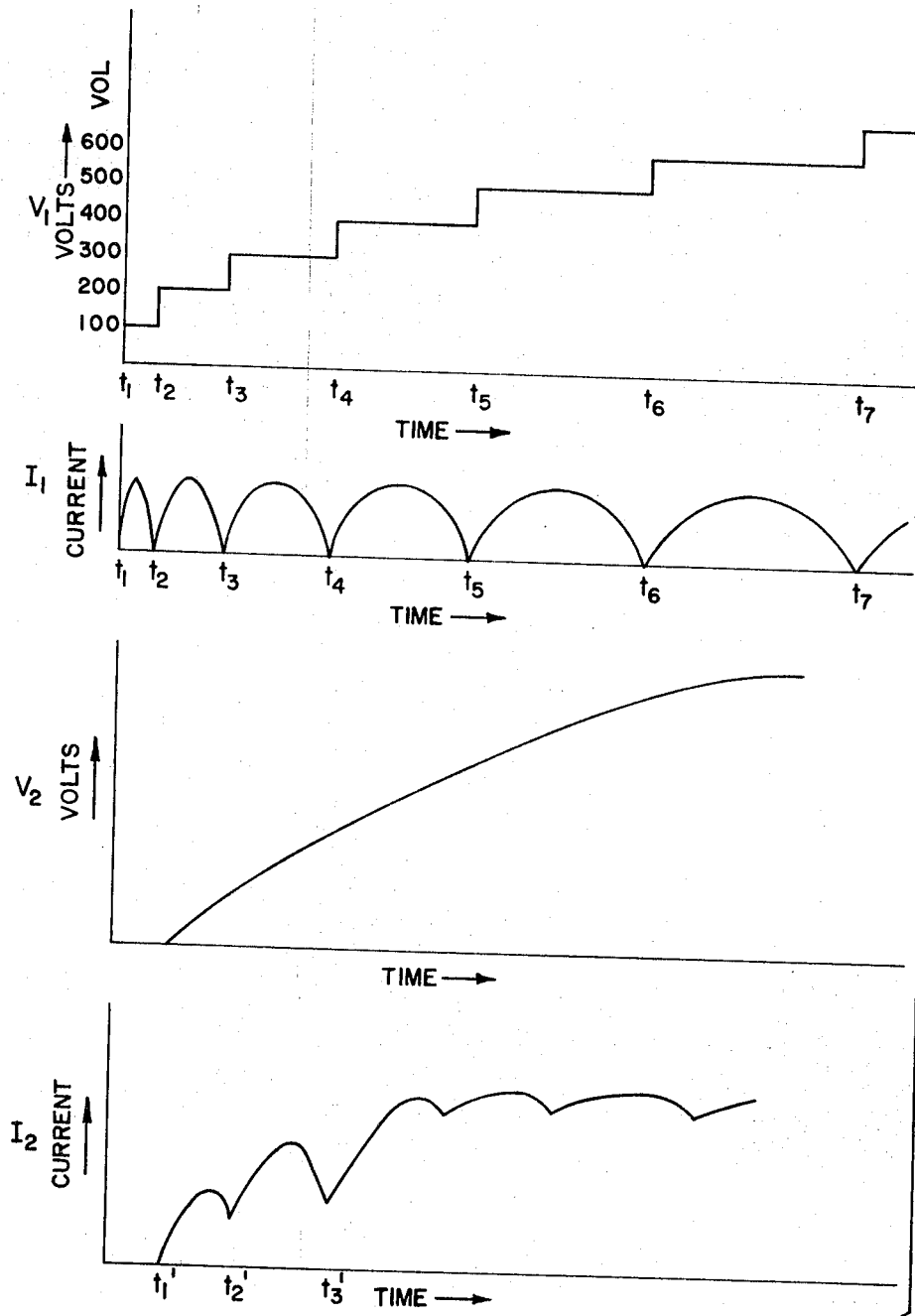

FIG. 4 comprises waveforms illustrating the operation of the circuits of FIGS. 2 and 3.

With reference now to the drawings, and particularly to FIG. 1, the circuit shown includes a source of direct current potential, such as a battery 10, connected through a switch 12, a diode 14 and an inductive choke 16 to a capacitor 18 which is to be charged. The capacitor 18, in turn, is discharged through a suitable discharge network, generally indicated by the reference numeral 20.

The capacitor 18, for example, may be used to fire the flash tube for a solid-state laser. Such capacitors may be charged, typically, at a rate of about 10 pulses per second to an energy level of 10 to 30 joules. This ordinarily requires a large and heavy power source, such as the battery 10. In order to prevent excessive current surges, the inductive choke must be large and, of necessity, heavy. In addition, systems of this type exhibit high RMS to average current ratios.

One embodiment of the present invention is shown in FIG. 2 and includes a pair of input terminals 22 and 24 adapted for connection to a source of direct current potential, not shown. The terminals 22 and 24 are again connected through an inductive choke 26 to a transfer device 28 enclosed by broken lines. As shown, the transfer device 28 includes a chopper circuit 30 comprising a pair of transistors 32 and 34 which are alternately fired to develop voltages of opposing polarity across the top and bottom portions of the primary winding 36 of a transformer 38. The transformer 38, in the embodiment of the invention shown herein, includes four secondary windings 40, 42, 44 and 46 connected, respectively; to full-wave bridge rectifiers 48, 50 52 and 54. The full-wave rectifiers 48–54 are connected through transistor switches 56, 58, 60 and 62 to one terminal, namely the positive terminal 64, of the capacitor 66 to be charged. The other terminal 68 of the capacitor 66 is connected back to one leg of the full-wave rectifier 48. Note that the rectifiers 48–54 are isolated one from the other by means of diodes 69, 70, 72 and 74.

As was explained above, the secondary windings 40–46 each have different turns thereon. For example, the winding 40 may have the least number of turns to produce a voltage of 100 volts. The winding 42 may have a greater number of turns to produce a voltage of 200 volts; the winding 44 may produce 400 volts; and the winding 46 may produce 800 volts. The bases of the transistors 56–62 are connected to a synchronizing circuit 76 which causes them to fire in sequence. The transistors 56–62 are usually fired in an overlapping manner. A table displaying the relationship is given below. The output (capacitor) voltage is the sum of voltages of the "ON" windings.

TABLE

| Step | Transistor 56 | Transistor 58 | Transistor 60 | Transistor 62 | Output Voltage |
|---|---|---|---|---|---|
| 1 | ON | OFF | OFF | OFF | 100 |
| 2 | OFF | ON | OFF | OFF | 200 |
| 3 | ON | ON | OFF | OFF | 300 |
| 4 | OFF | OFF | ON | OFF | 400 |
| 5 | ON | OFF | ON | OFF | 500 |
| 6 | OFF | ON | ON | OFF | 600 |
| 7 | ON | ON | ON | OFF | 700 |
| 8 | OFF | OFF | OFF | ON | 800 |
| 9 | ON | OFF | OFF | ON | 900 |
| 10 | OFF | ON | OFF | ON | 1000 |
| 11 | ON | ON | OFF | ON | 1100 |
| 12 | OFF | OFF | ON | ON | 1200 |
| 13 | ON | OFF | ON | ON | 1300 |
| 14 | OFF | ON | ON | ON | 1400 |
| 15 | ON | ON | ON | ON | 1500 |

In this manner, it can be seen that progressively larger voltages are applied across the capacitor 66 as the transistors are fired in a predetermined sequence. The capacitor 66 may, for example, be discharged through a suitable discharge network 78.

The operation of the circuit can best be understood by reference to FIG. 4 where the waveforms $V_1$ and $I_1$ illustrate the case where each transistor is fired in sequence after the current delivered through other transistors drops to zero. Thus, at time $t_1$, for example, transistor 56 fires, thereby causing the voltage across the capacitor to rise to 100 volts while the current rises and then decays back to zero. At time $t_2$, transistor 58 fires and transistor 56 turns OFF; but now the voltage is raised to 200 volts; and again the current rises and then falls until time $t_3$ where transistor 56 fires while transistor 58 remains ON and the voltage is raised to 300 volts. At time $t_4$, transistors 56 and 58 turn OFF and transistor 60 turns ON and the voltage rises to 400 volts. Such sequential switching continues, each step adding 100 volts to the preceding step, until the time $t_{15}$ is reached (not shown in FIG 4) where transistors 56–62 are ON and the voltage reaches 1,500 volts. In this manner, it can be seen that the current surge at any time is relatively low, with the result that the size of the inductor 26, as well as the size of the power source connected to terminals 22 and 24 can be minimized.

Note that the time elapse between times $t_1$ and $t_2$ is less than that between times $t_2$ and $t_3$ and that this latter time elapse is less than that between times $t_3$ and $t_4$, and so on. This is due to the fact that the charging time is equal to:

$$t = 2\pi n \sqrt{LC}$$

where
  $t$ = charging time,
  $n$ = turns ratio of transformer 38, i.e., number of turns on the secondary windings 40–46, divided by the number of turns on the primary 36,
  $L$ = inductance of inductor 26 and
  $C$ = capacitance of capacitor 66.

Therefore, as the number of turns on the secondary winding increases, meaning that the voltage is increasing, the charging time also increases.

Instead of firing each transistor 56–62 after the current falls to zero, one transistor may be fired before the current through other transistors drops to zero. This is shown, for example, by the waveforms $I_2$ and $V_2$ of FIG. 4. At time $t_1'$, transistor 56 is fired, but before the current drops to zero at time $t_2'$, transistor 58 is fired. Likewise, at time $t_3'$, with transistor 58 still ON, the transistor 56 is again fired in accordance with the foregoing table but before the current drops to zero. In this manner, the current builds up as shown by waveform $i_2$ without dropping back to zero with the result that the RMS to average current ratio is quite small. As shown by waveform $V_2$, the voltage rises steadily.

In FIG. 3, another embodiment of the invention is shown which is similar to that of FIG. 2. Accordingly, elements shown in FIG. 3 which correspond to those of FIG. 2 are identified by like reference numerals. In this case, the inductive choke 26' is on the output side of the transfer device 28. The operation of the circuit, however, is similar to that of FIG. 2.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a system for charging a capacitor by direct current resonant charging techniques, the combination of a pair of input terminals adapted for connection to a source of direct current power, a transfer device having a direct current chopper circuit connected to said terminals and inductively coupled through primary winding means to a plurality of secondary windings, each secondary winding having a different turns ratio with respect to said primary winding means whereby the voltages appearing across said secondary windings will differ one from the other, full wave rectifier means connected to the output of said secondary windings, transistor switch means for connecting said secondary windings across said capacitor in sequence whereby the voltage across the capacitor will rise in steps, an inductive choke interposed between said input terminals and said capacitor, and a synchronizing circuit connected to the bases of said transistors for causing them to fire in sequence.

2. The system of claim 1 wherein said transistors are fired in sequence to connect the secondary windings to said capacitor such that the voltage across said capacitor increases in steps.

3. The system of claim 1 including rectifiers interposed between said secondary windings and said transistors.

4. The system of claim 3 including diodes connected across the output terminals of said rectifiers.

5. The system of claim 4 wherein the output voltages across said rectifiers are applied in series across said capacitor.

* * * * *